United States Patent
Buglass et al.

(10) Patent No.: US 6,895,746 B2
(45) Date of Patent: May 24, 2005

(54) REDUCING OXIDES OF NITROGEN USING HYDROGEN GENERATED FROM ENGINE FUEL AND EXHAUST

(75) Inventors: John G. Buglass, Amsterdam (NL); Francis A. Kocum, Glastonbury, CT (US); Ke Liu, East Longmeadow, MA (US); Ronald J. Schoonebeek, Amsterdam (NL); Antonio M. Vincitore, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 10/159,369

(22) Filed: May 31, 2002

(65) Prior Publication Data

US 2003/0221413 A1 Dec. 4, 2003

(51) Int. Cl.[7] ................................................. F01N 3/00
(52) U.S. Cl. .......................... 60/286; 60/274; 60/295; 60/301; 60/309
(58) Field of Search .................. 60/275, 295, 301, 60/286, 274, 309

(56) References Cited

U.S. PATENT DOCUMENTS

| | | | | |
|---|---|---|---|---|
| 3,779,014 A | * | 12/1973 | Nohira et al. | 60/286 |
| 4,109,461 A | * | 8/1978 | Fujitani et al. | 60/274 |
| 5,412,946 A | * | 5/1995 | Oshima et al. | 60/286 |
| 6,092,512 A | * | 7/2000 | Ma | 123/568.15 |
| 6,103,411 A | * | 8/2000 | Matsubayashi et al. | 429/17 |
| 6,170,259 B1 | | 1/2001 | Boegner et al. | |
| 6,318,306 B1 | * | 11/2001 | Komatsu | 123/3 |
| 6,357,227 B1 | * | 3/2002 | Neufert | 60/309 |
| 6,363,716 B1 | | 4/2002 | Balko et al. | |
| 6,560,958 B1 | * | 5/2003 | Bromberg et al. | 60/275 |
| 2002/0062641 A1 | | 5/2002 | Shiino et al. | |

FOREIGN PATENT DOCUMENTS

JP 54-113721 * 9/1979

* cited by examiner

Primary Examiner—Thomas Denion
Assistant Examiner—Diem Tran
(74) Attorney, Agent, or Firm—M. P. Williams (57) ABSTRACT

Either (a) the exhaust (20) of an engine (9) and/or (b) inlet air (11) is sent to a hydrogen generator (22) along with diesel fuel (18) to produce hydrogen and carbon monoxide (26) for either (c) mixing with the mainstream of exhaust fed to a catalytic converter (28) or (d) regenerating a pair of NOx adsorption traps (35, 36), thereby reducing oxides of nitrogen (NOx) to provide system exhaust (29) which may have less than 0.20 grams/bhp/hr of NOx and 0.14 grams/bhp/hr of non-methane hydrocarbons. A water recovery unit (52, 63) may extract water from either the exhaust or the effluent of the NOx traps to humidify inlet air (11) for mixture with fuel. Inlet air (11) may be humidified in an air bubbling humidifier (72) that receives water from a condenser (76) that uses inlet air to cool NOx trap effluent.

24 Claims, 7 Drawing Sheets

REDUCING OXIDES OF NITROGEN USING HYDROGEN GENERATED FROM ENGINE FUEL AND EXHAUST

TECHNICAL FIELD

This invention relates to reducing oxides of nitrogen (NOx) in the exhaust of hydrocarbon-fueled, internal combustion engines and more particularly to using hydrogen generators, such as catalytic partial oxidizers (CPOx), non-catalytic (homogeneous) partial oxidizers (POx), or auto thermal reformers (ATR), to generate from engine fuel and exhaust, streams including hydrogen and carbon monoxide for use in NOx catalytic converters or NOx-reducing adsorption filters.

BACKGROUND ART

The Environmental Protection Agency (EPA) has set, for 2007 and beyond, vehicle internal combustion engine emission requirements; one exemplary requirement for diesel engines, is NOx and non-methane hydrocarbons below 0.20 grams bhp-hr and 0.14 grams/bhp-hr, respectively. This contrasts with current standards of 4.0 grams/bhp-hr and 1.3 grams/bhp-hr, respectively. Thus, the catalytic converters must accomplish a significant reduction in NOx. There currently are no catalyst formulations which are able to adequately reach these restrictive standards; significant development will be required to reduce the cost and improve performance of new catalyst formulations. Apparatus that oxidizes engine fuel to provide a mix that enhances NOx reduction is disclosed in U.S. Pat. No. 5,412,946, in PCT published application WO 01/34950, and U.S. patent application Publication 2001/41153.

DISCLOSURE OF INVENTION

Objects of the present invention include: improvement in the reduction of NOx to nitrogen and other harmless gases; achieving NOx reduction that meets EPA 2007 NOx emission requirements; and providing improved generation of hydrogen in and for an internal combustion engine exhaust emission reduction system.

According to the present invention, moisture and possibly oxygen, derived from the exhaust of a hydrocarbon-fueled, internal combustion engine are processed along with fuel from the engine's fuel tank in a fuel processor, which may be a catalytic partial oxidation reformer, a non-catalytic (homogeneous) partial oxidation reformer, or an auto thermal reformer, to generate a stream of hydrogen and carbon monoxide which is used, either directly or following the reaction of NOx with other compounds, to eliminate NOx in the exhaust. For example, the hydrogen-rich stream may either (a) be mixed with the main exhaust stream for processing in a NOx-reducing catalytic converter, or (b) used to regenerate NOx traps following the formation of nitrogen-containing compounds by reaction of the exhaust with adsorbent in the NOx traps. In various embodiments of the invention, air is also fed, such as from ambient, to the fuel processor; steam is extracted from engine exhaust and from NOx trap effluent; air is humidified; and fuel is vaporized.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
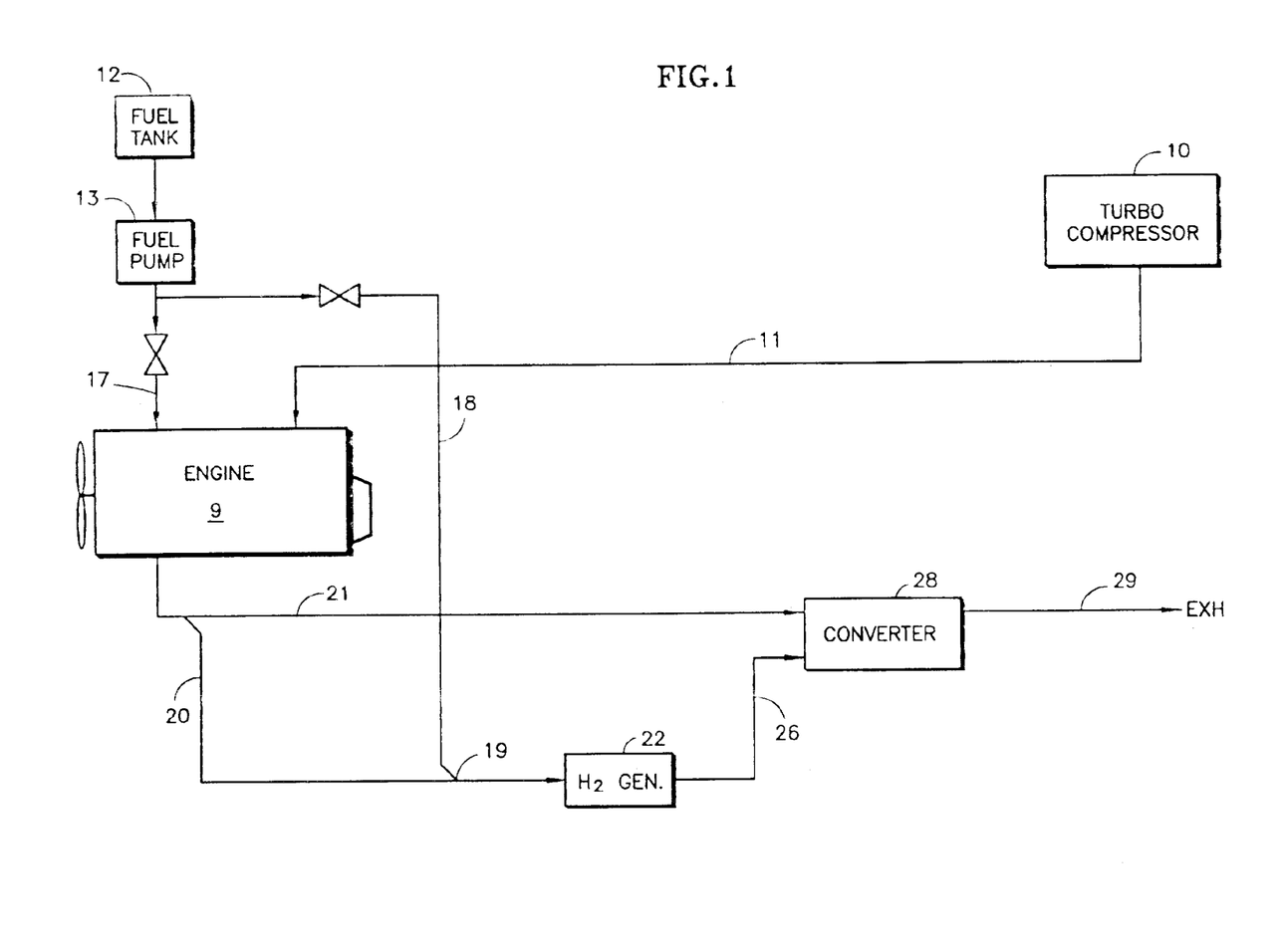
FIG. 1 is a simplified, stylized schematic illustration of an engine incorporating a first embodiment of the present invention.

In FIG. 1, an engine 9 has a conventional turbo compressor 10 feeding an air inlet line 11, a hydrocarbon fuel tank 12, and a fuel pump 13. The fuel may be diesel fuel, gasoline, natural gas, liquid petroleum gas, or propane. The fuel is fed by a first line 17 to the engine for combustion with the air, and is fed by a second line 18 to a mixer 19 in a pipe 20 that feeds a small amount of exhaust from an exhaust pipe 21 to a hydrogen generator 22. The hydrogen generator 22 may be a catalytic partial oxidizer (CPOx), a non-catalytic (homogeneous) partial oxidizer, or an auto thermal reformer (ATR). Within the hydrogen generator, if it is a CPOx, foam monolith or other form of catalyst, which may comprise a group VIII metal, preferably nickel, cobalt, rhodium, iridium or platinum, convert fuel along with hydrocarbons, water and oxygen into a mix of hydrogen, CO and $CO_2$. This is provided through a conduit 26 to an NOx reducing catalytic converter 28, the output of which is exhausted by a pipe 29, typically to ambient. The converter 28 is of the type commonly used in diesel engines. In normal operation, it is expected that the water content will vary between 2% and 9% and the oxygen content will vary between 5% and 17%. Using diesel fuel, it may require up to 7% of consumed fuel to clean up the exhaust, which is acceptable. In the converter 28, the exhaust—hydrogen, oxides of nitrogen, carbon monoxide and carbon dioxide—is converted to mainly nitrogen, water, and carbon dioxide, with traces of non-methane hydrocarbons and oxides of nitrogen. With proper adjustment for the particular engine and desired performance range (utilizing valves and possibly a controller responding to sensors, all known in the art), the invention will permit reducing the NOx to 0.20 grams/bhp/hr and non-methane hydrocarbons to 0.14 grams/bhp/hr.

Figure 2:
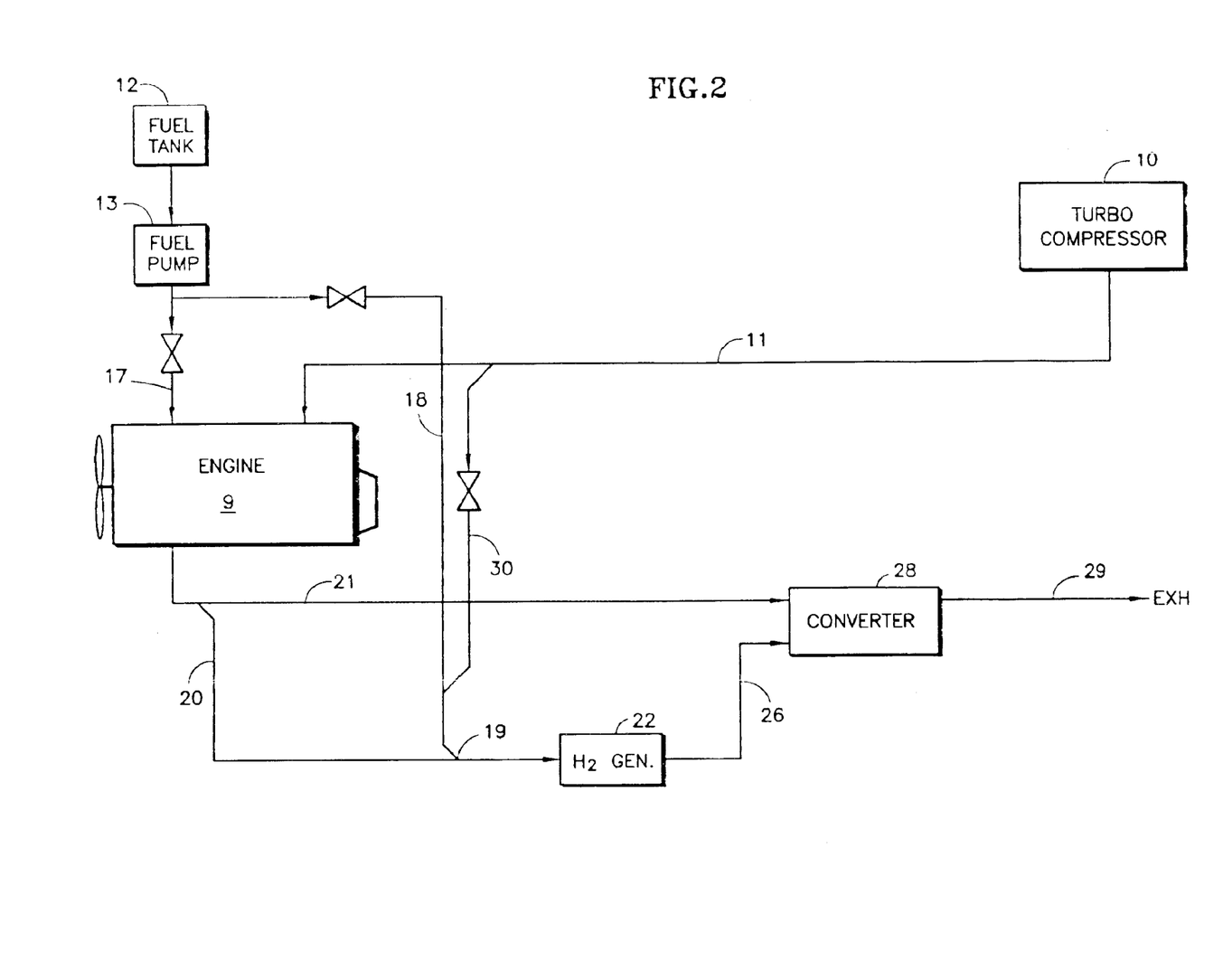
FIG. 2 is a simplified, stylized schematic illustration of an engine incorporating a second embodiment of the present invention.

In a second embodiment of the invention illustrated in FIG. 2, in any case where there is insufficient oxygen in the exhaust to produce the required amount of hydrogen in the generator 22, air may be fed by a conduit 30 from the air inlet line 11 for mixture with the fuel in pipe 18.

FIGS. 1 and 2 are rudimentary embodiments of the present invention. In FIGS. 1 and 2, the NOx is treated continuously in a known converter. In accordance with the invention, a more effective elimination of NOx comprises utilizing adsorption traps in alternating collection/regeneration cycles.

Figure 3:
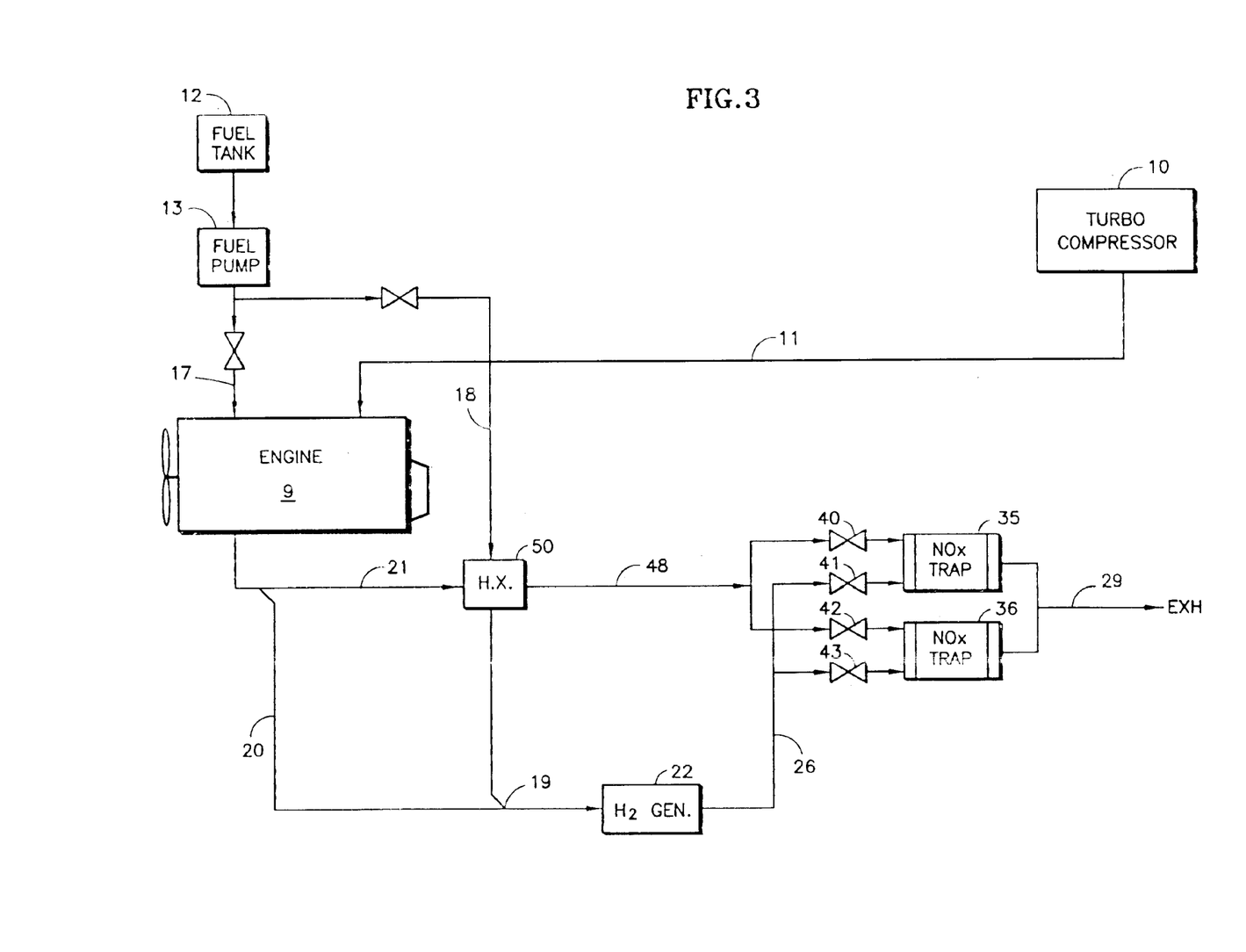
FIG. 3 is a simplified, stylized schematic illustration of an engine incorporating a third embodiment of the present invention.

Referring to FIG. 3, a pair of NOx adsorbent traps 35, 36 are alternatively connected by corresponding valves 40–43 to either the conduit 26 with hydrogen-containing gas from the generator 22, or to a pipe 48 containing engine exhaust.

The valves are controlled so that engine exhaust is allowed to flow in one of the traps 35, 36 for a period of time which is less than the time necessary to saturate it with NOx, and then the valves are switched so that exhaust flows in the other NOx trap, while the first NOx trap is regenerated by the hydrogen and carbon monoxide from the generator 22. In one cycle, the valves 40, 43 will be open and the valves 41 and 42 will be closed; in the next cycle, the valves 41 and 42 will be open and the valves 40 and 43 will be closed, and so forth. The NOx traps may, for example, contain barium carbonate ($BaCO_3$) as the adsorbent: when the diesel exhaust is adsorbed by the barium carbonate, a reaction generates barium nitrate.

$$2NOx + BaCO_3 \rightarrow Ba(NO_3)_2 + CO_2$$

Then, during the regeneration cycle, the barium nitrate is converted back to barium carbonate, as follows:

$$3H_2 + 2CO + Ba(NO_3)_2 \rightarrow BaCO_3 + N_2 + 3H_2O + CO_2$$

FIG. 3 also illustrates that preferred embodiments of the invention may use a heat exchanger 50 to cause heat of the engine exhaust to vaporize the fuel in the line 18 before applying it to the reformer, which is particularly useful in the case of a CPOx oxidizer.

A CPOx oxidizer is preferred because it is very small and can run with low steam carbon ratios and high turndown ratios without soot or carbon formation. However, diesel engine exhaust contains particulates (soot) and oxides of sulfur (SOx), which may deactivate the CPOx catalyst in a relatively short period of time. Therefore, a non-catalytic (homogeneous) partial oxidizer may be selected as the hydrogen generator 22. The percentage of hydrogen produced is only slightly less than that produced by a CPOx. It is easily started by employing a simple spark plug, as is known. Additionally, POX is cheaper than CPOx; control of the $O_2/C$ ratio is known (similar to engine $O_2$/fuel ratio), and simpler; SOx and soot do not affect it; and there is no steam/C ratio problem.

Figure 4:
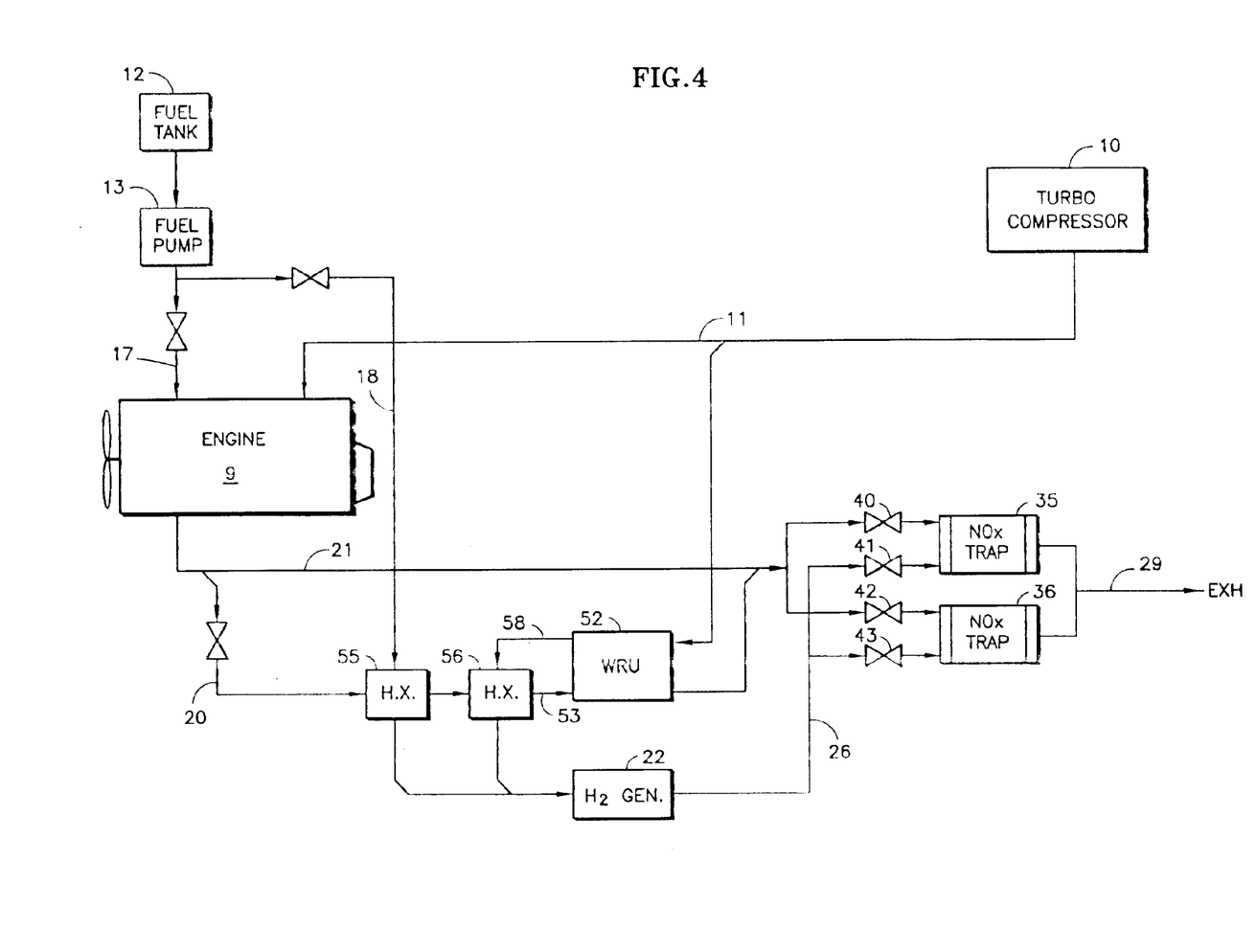
FIG. 4 is a simplified, stylized schematic illustration of an engine incorporating a fourth embodiment of the present invention.
Figure 5:
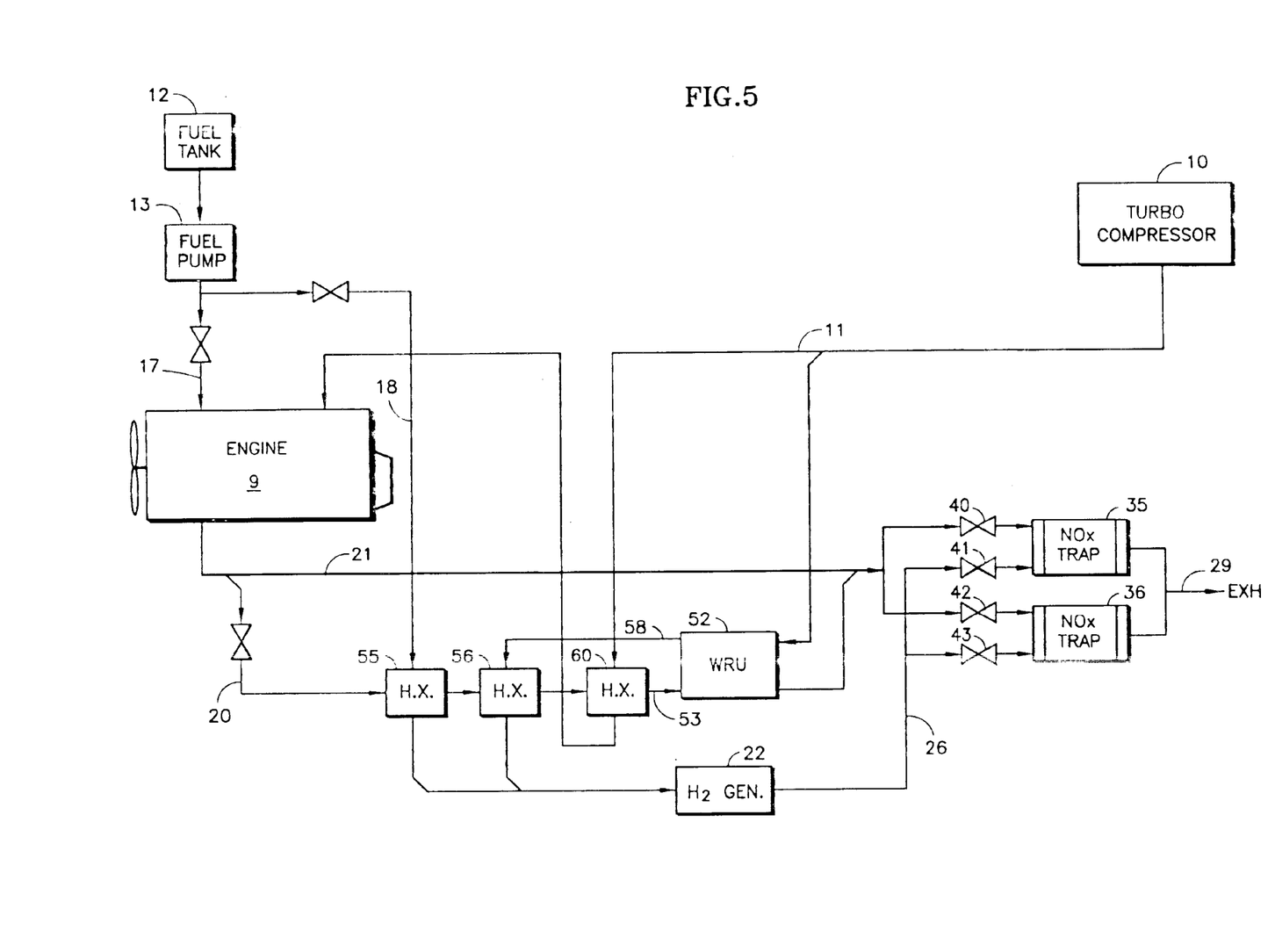
FIG. 5 is a simplified, stylized schematic illustration of an engine incorporating a fifth embodiment of the present invention.

In FIG. 4, air (for oxygen) is humidified (for steam) before being introduced into the generator 22. To achieve this, a water recovery unit (WRU) 52 receives air from the air inlet 11 and a portion of the engine exhaust in a line 53. The WRU contains special materials that have a high degree of moisture diffusivity, one example of which is that sold under the tradename NAFION. The WRU extracts moisture (steam) from the exhaust stream and imparts it into the air stream, thereby to provide both oxygen and steam to the generator 22 in greater concentration in the air stream than it appears in the exhaust stream itself. However, the maximum temperature at which some material in the WRU will function is less than 250° C. and the lower the temperature, the better the performance, whereas the temperature of diesel engine exhaust is in the range of 110° C.–290° C. The engine exhaust is fed from the pipe 20 through two heat exchangers 55, 56 to vaporize the fuel (as described hereinbefore) and to further heat the exhaust stream of the WRU 52 on a line 58, before applying it to the generator 22. Since the steam level in the exhaust is relatively low, on the order of between 2 and 6 mol %, recovering sufficient steam to feed the generator 22 requires cooling a sufficient portion of exhaust, which the heat exchangers 55, 56 serve to do. However, further cooling can be achieved as illustrated in FIG. 5 by providing an additional heat exchanger 60 which receives all of the air in the air inlet line 11 to significantly cool the exhaust in the line 53 before it is applied to the water recovery unit 52.

Figure 6:
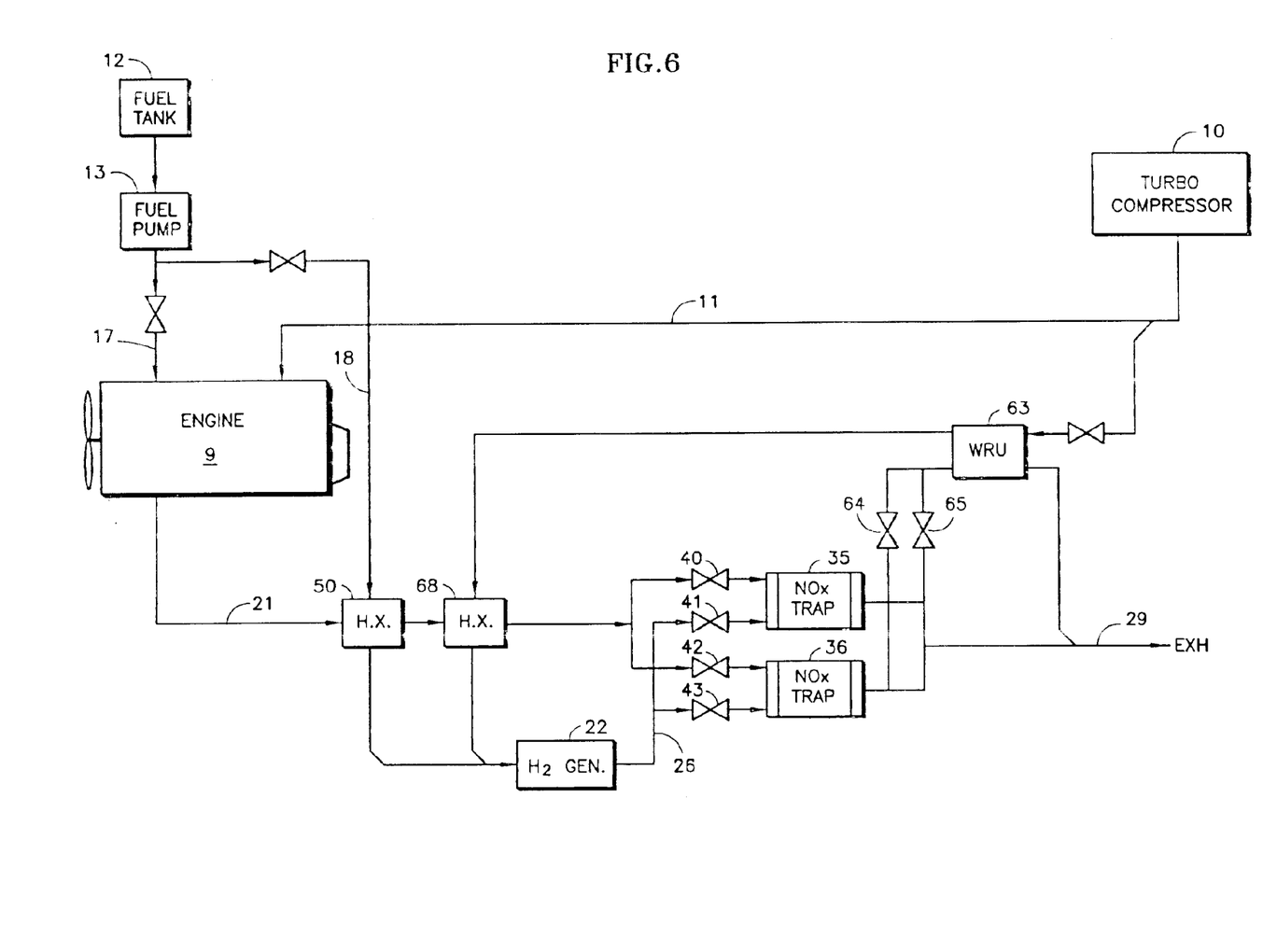
FIG. 6 is a simplified, stylized schematic illustration of an engine incorporating a sixth embodiment of the present invention.

The effluent of the NOx traps 35, 36 may be as high as 50% water (steam), since all of the hydrogen produced by the generator 22 is converted to water during the reducing reaction (the regeneration formula hereinbefore). In FIG. 6, a WRU 63 receives air from the air inlet 11 and the effluent of whichever NOx trap 35, 36 is being regenerated at any moment in time. A pair of valves 64, 65 work in conjunction with the valves 40–43 such that when the valves 40, 42 are open the valve 64 will be open, and when the valves 41, 42 are open, the valve 65 will be open. The WRU 63 extracts water from the effluent which is picked up by the air. The humidified air is passed through a heat exchanger 68 for application to the generator 22 with the vaporized fuel from the heat exchanger 50.

Figure 7:
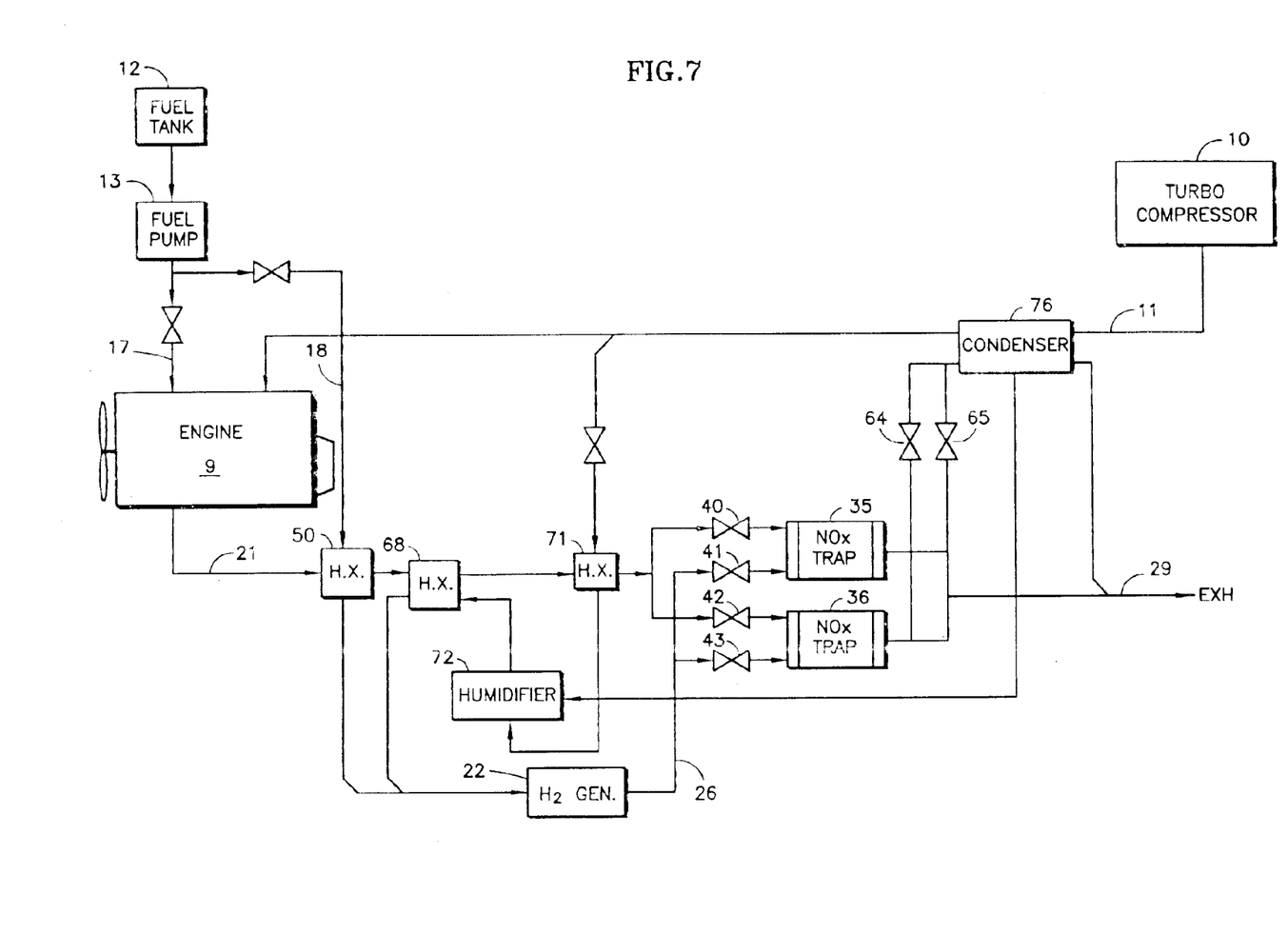
FIG. 7 is a simplified, stylized schematic illustration of an engine incorporating a seventh embodiment of the present invention.

In the embodiment of FIG. 7, heat from the exhaust of the engine is used to vaporize fuel in the heat exchanger 50 and to heat up humidified air from the air inlet 11 in the heat exchanger 68 as well as another, very small heat exchanger 71. The warm air from the heat exchanger 71 is brought to an air-bubbling humidifier 72 which is supplied water from a condenser 76 to humidify the warm air. Then, the humidified air is warmed further in the heat exchanger 68 before being mixed with the vaporized fuel from the heat exchanger 50 for application to the reformer. The condenser 76 utilizes the full volume of air in the air inlet 11 to cool off the effluent from the NOx traps 35, 36 thereby condensing the water therefrom. This water is then drained and fed over to the humidifier 72, where it is taken up by the warm air from the heat exchanger 71. Thus, as exemplified in the embodiments of FIGS. 5–7, the invention does not require using oxygen taken from the engine exhaust.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A system for reducing oxides of nitrogen (NOx) in the exhaust of a hydrocarbon-fueled, internal combustion engine which operates with fuel from a source and which provides engine exhaust in an exhaust pipe and receives air from an air inlet, comprising:

a hydrogen generator having an inlet and an outlet for converting engine fuel, oxygen and moisture to hydrogen and carbon monoxide;

means for providing a mixture of fuel from said source with air humidified with moisture derived from said engine exhaust to the inlet of said hydrogen generator, said hydrogen generator providing an outflow at its outlet including hydrogen and carbon monoxide; and means for receiving said engine exhaust and said outflow for reducing the NOx in said engine exhaust to provide system exhaust with diminished NOx.

2. A system according to claim 1 further comprising:

a heat exchanger for vaporizing engine fuel before it is added into said mixture.

3. A system according to claim 1 wherein said mixture includes fuel and humidified air, and said air is humidified from exhaust by means of a water recovery unit.

4. A system according to claim 1 wherein said means for providing a mixture comprises a water recovery unit in which moisture, extracted from engine exhaust, humidifies air.

5. A system according to claim 4 further comprising:

a heat exchanger receiving humidified air out of said water recovery unit to cool engine exhaust input to said water recovery unit.

6. A system according to claim 4 further comprising:

a heat exchanger receiving engine inlet air to cool engine exhaust input to said water recovery unit.

7. A system according to claim 1 wherein said means for reducing the NOx comprises at least one NOx trap, each NOx trap alternately trapping NOx in said exhaust and being regenerated by said outflow.

8. A system according to claim 7 wherein said means for providing a mixture utilizes moisture extracted from the effluent of at least one said NOx trap to humidify said air.

9. A system according to claim 8 wherein said means for providing a mixture comprises a water recovery unit.

10. A system according to claim 8 wherein said means for providing a mixture comprises a condenser cooled by air from said air inlet and a humidifier receiving moisture from said condenser.

11. A system according to claim 1 wherein said hydrogen generator is selected from an auto-thermal reformer, a catalytic partial oxidizer and a non-catalytic partial oxidizer.

12. A system according to claim 1 wherein said means for providing a mixture comprises an air bubbling humidifier receiving moisture derived from engine exhaust.

13. A system according to claim 12 wherein said means for reducing NOx comprises a pair of NOx traps, and the effluent from said NOx traps is fed to a condenser, said effluent being cooled and the steam in said effluent being condensed in said condenser by said air inlet air, water produced in said condenser being provided to said humidifier.

14. Apparatus for diminishing oxides of nitrogen (NOx) in the exhaust of a system, said apparatus comprising:
 a hydrocarbon-fueled engine that provides engine exhaust containing NOx;
 means for generating hydrogen from a mixture of engine fuel and air humidified with moisture derived from said engine exhaust, to provide a flow including hydrogen and carbon monoxide; and
 means for using the flow of hydrogen and carbon monoxide for reducing NOx in said engine exhaust to provide system exhaust with diminished NOx.

15. A method of diminishing oxides of nitrogen (NOx) in the exhaust of a system including a hydrocarbon-fueled engine that provides engine exhaust containing NOx, said method comprising:
 generating hydrogen from a mixture of engine fuel and air humidified by moisture derived from said engine exhaust, to provide a flow including hydrogen and carbon monoxide; and
 using the flow of hydrogen and carbon monoxide for reducing NOx in said engine exhaust to provide system exhaust with diminished NOx.

16. A method according to claim 15 wherein:
 said generating step comprises reforming a mixture containing vaporized fuel.

17. A method according to claim 16 wherein:
 said generating step comprises vaporizing fuel by heat exchange with said exhaust.

18. A method according to claim 15 wherein:
 said generating step comprises reforming a mixture containing air humidified by moisture of said exhaust in a water recovery unit.

19. A method according to claim 18 wherein:
 said generating step comprises the substep of cooling the exhaust before application thereof to said water recovery unit.

20. A method according to claim 15 wherein:
 said step of reducing NOx employs at least one NOx trap, and said generating step comprises extracting said moisture from the effluent of at least one of said NOx traps and humidifying said air for said mixture therewith.

21. A method according to claim 20 wherein:
 said humidifying substep comprises humidifying air in an air bubbling humidifier receiving said moisture extracted from said effluent.

22. A method according to claim 15 wherein:
 said humidifying substep comprises humidifying air in a bubble humidifier receiving water.

23. A method according to claim 15 wherein:
 said step of reducing NOx comprises applying said exhaust and said flow, contemporaneously, to a NOx reducing catalytic converter.

24. A method according to claim 15 wherein:
 said step of reducing NOx comprises alternately applying said engine exhaust and said flow to at least one NOx trap, separately.

\* \* \* \* \*